(12) United States Patent
Kakiuchi

(10) Patent No.: US 7,583,890 B2
(45) Date of Patent: Sep. 1, 2009

(54) ANTI-SHAKE APPARATUS

(75) Inventor: Shinichi Kakiuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 353 days.

(21) Appl. No.: 11/535,669

(22) Filed: Sep. 27, 2006

(65) Prior Publication Data

US 2007/0071427 A1    Mar. 29, 2007

(30) Foreign Application Priority Data

Sep. 28, 2005    (JP)    ............................ P2005-282224

(51) Int. Cl.
*G03B 17/00*    (2006.01)
*G03B 7/083*    (2006.01)
*G03B 7/093*    (2006.01)
*H04N 5/228*    (2006.01)

(52) U.S. Cl. ........................... 396/55; 396/53; 396/246; 348/208.2; 348/208.4

(58) Field of Classification Search .................. 396/55, 396/52–54, 246; 348/208.99, 208.1, 208.2, 348/208.4, 208.14; 359/554, 557
See application file for complete search history.

(56) References Cited

U.S. PATENT DOCUMENTS 6,982,746 B1 * 1/2006 Kawahara .............. 348/208.99

2002/0027599 A1 * 3/2002 Yamazaki .................. 348/208
2005/0264656 A1   12/2005 Seo et al.
2006/0008263 A1    1/2006 Kakiuchi

FOREIGN PATENT DOCUMENTS

JP    06-67255    3/1994

OTHER PUBLICATIONS

English Language Abstract of JP 06-67255, Mar. 14, 1994.
U.S. Appl. No. 11/550,063, to Nomura et al., filed Oct. 17, 2006.

* cited by examiner

*Primary Examiner*—Rochelle-Ann J Blackman
(74) *Attorney, Agent, or Firm*—Greenblum & Bernstein, P.L.C.

(57) ABSTRACT

An anti-shake apparatus for a photographic device includes an angular velocity detector, a position signal generator, a shake corrector, and an exposure time setter. The angular velocity detector detects the angular velocity of the photographic device. The position signal generator generates position signals representing a position of the photographic device by integrating the angular velocity. The shake corrector corrects a shake of the photographic device, based on the position signals. The exposure time setter sets an exposure time of the photographic device. The shake corrector corrects the shake based on the position signals that have frequencies higher than the predetermined cut-off frequency, which is determined in accordance with the exposure time.

9 Claims, 5 Drawing Sheets

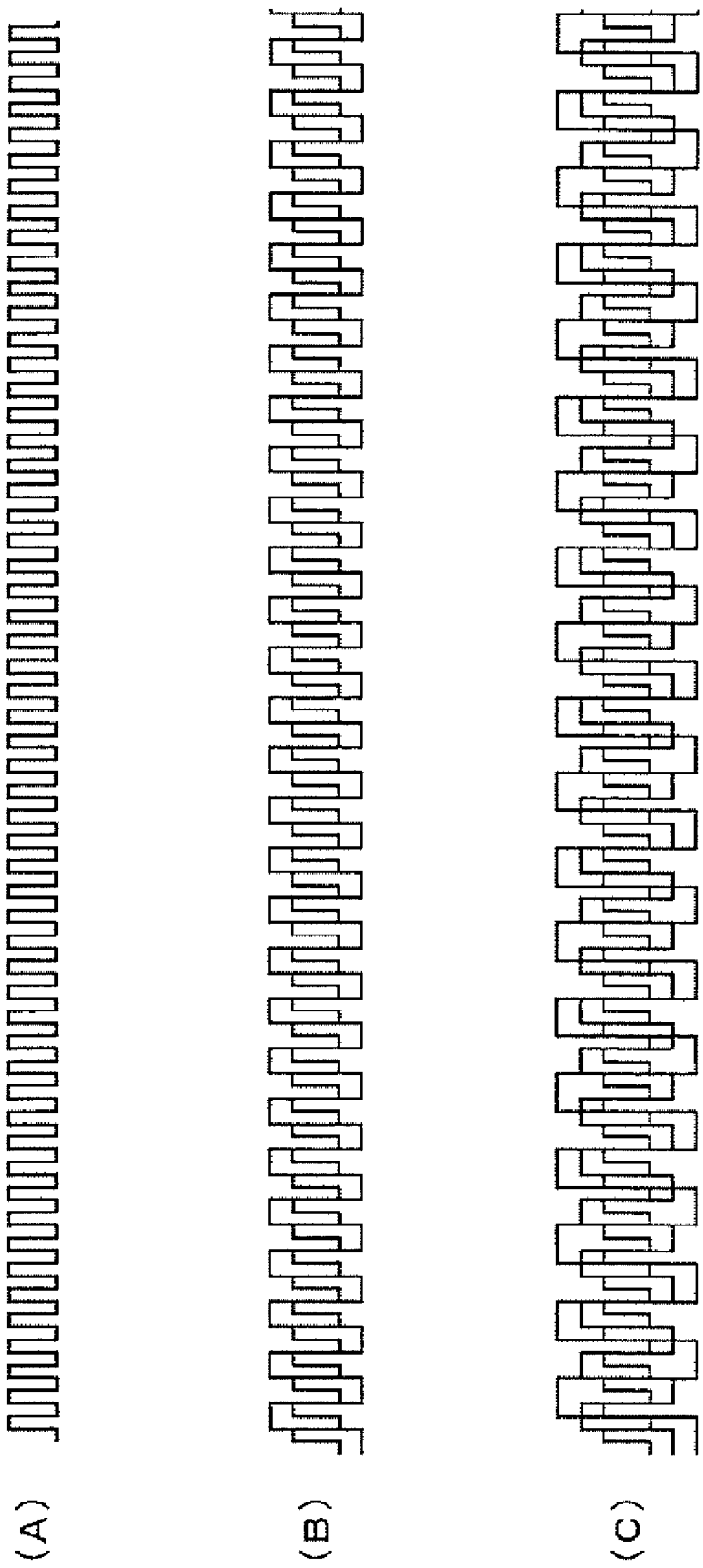

ANTI-SHAKE APPARATUS

BACKGROUND OF THE INVENTION

1. Field of the Invention

The present invention relates to an anti-shake apparatus that is loaded into a camera or other photographic devices.

2. Description of the Related Art

Some photographic devices, such as cameras and video cameras, have an anti-shake apparatus. In an anti-shake apparatus, the shake of a photographic device (the direction and amplitude of shake of a photographic device) is detected, for example, by a gyro sensor. Then, if the photographic device is a digital camera, an imaging device is moved, and if the photographic device is a silver-halide camera or a pair of binoculars, a correcting optical system is driven, so that the detected shake is canceled. As a result, the shake is corrected and images or views without shaken images are obtained.

With such an anti-shake apparatus, the correctable shake amount is limited. For example, in a digital camera, a shake is corrected within the movable area of an imaging device.

With a current anti-shake apparatus, the shake may not be corrected sufficiently, if the shake amount is larger than the correctable amount. For example, if a user moves a camera widely to capture a subject quickly and a high amount of shake occurs, a correcting optical system is moved and stopped at the limit position of its movable area, so that the shake is not corrected sufficiently. At that time, if generation of a subject is commanded when a relatively short exposure time is set, the exposure time may be over before the anti-shake function works, and the shake may not be corrected at all.

SUMMARY OF THE INVENTION

Therefore, an objective of the present invention is to provide an anti-shake apparatus that enables precise shake correction even when a severe shake occurs.

An anti-shake apparatus for a photographic device, according to the present invention, includes an angular velocity detector, a position signal generator, a shake corrector, and an exposure time setter. The angular velocity detector detects the angular velocity of the photographic device. The position signal generator generates position signals representing a position of the photographic device by integrating the angular velocity. The shake corrector corrects a shake of the photographic device, based on the position signals. The exposure time setter sets an exposure time of the photographic device. The shake corrector corrects the shake based on the position signals that have frequencies higher than the predetermined cut-off frequency, which is determined in accordance with the exposure time.

A photographic device according to the present invention includes an angular velocity detector, a shake corrector, and an exposure time setter. The angular velocity detector detects an angular velocity of the photographic device. The shake corrector corrects a shake of the photographic device, based on the angular velocity. The exposure time setter sets an exposure time of the photographic device. A component of the shake that the shake corrector can correct is determined in accordance with the exposure time.

BRIEF DESCRIPTION OF THE DRAWINGS

The present invention will be better understood from the description of the preferred embodiment of the invention set forth below, together with the accompanying drawings, in which:

FIG. 5 is a view representing the frequency components that are targets of shake correction, and that are represented in FIG. 4.

DESCRIPTION OF THE PREFERRED EMBODIMENT

Hereinafter, the first embodiment of the present invention is described with reference to the attached drawings.

Figure 1:
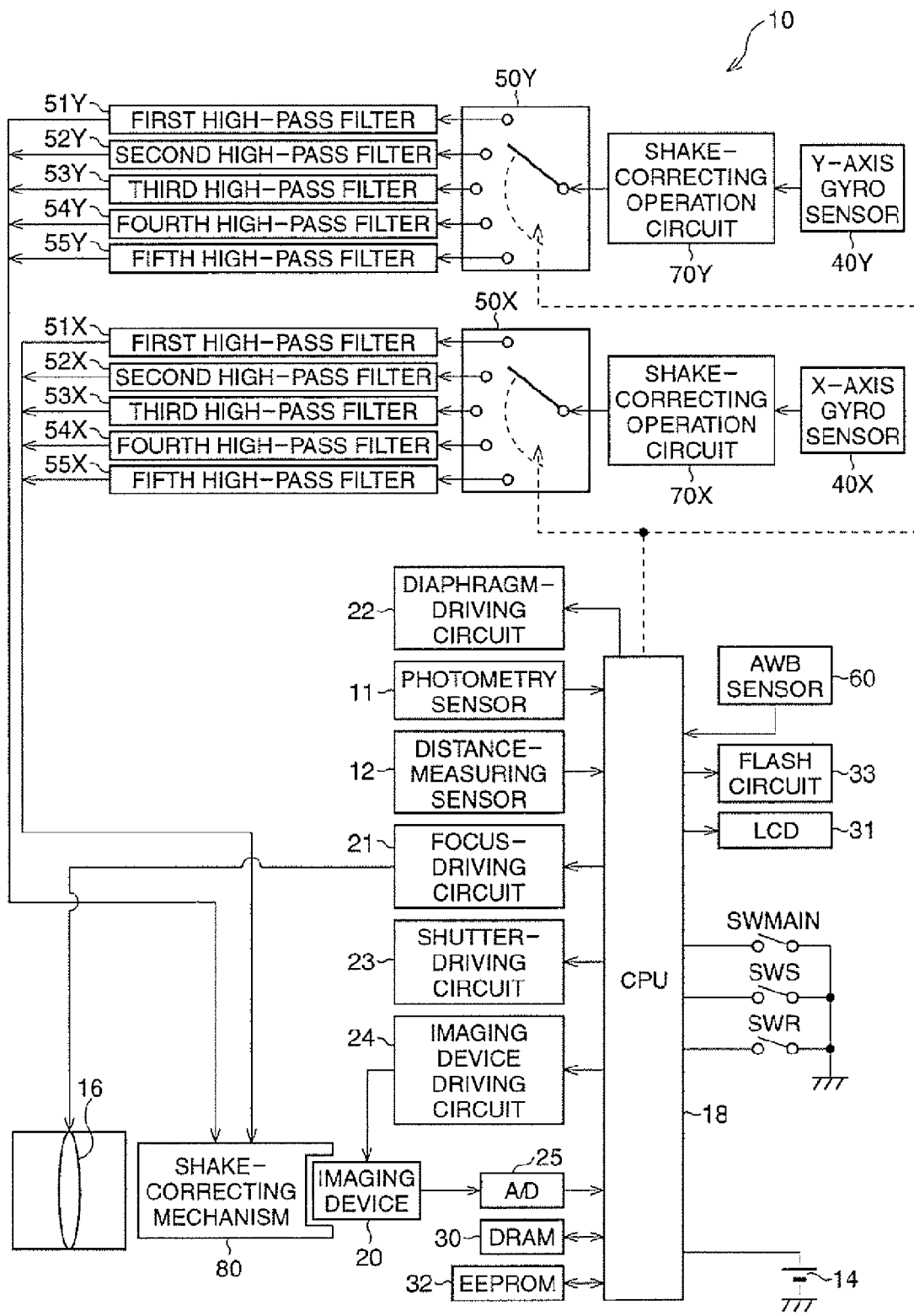
FIG. 1 is a block diagram of a digital camera of an embodiment of the present invention.

As shown in FIG. 1, in a digital camera 10, a CPU 18 that controls entire the digital camera 10 is provided. A power switch SWMAIN is controlled to be in an on or off state, by an operation of a power button (not shown) on a surface of the digital camera 10. When the power switch SWMAIN is turned on, electric power is supplied from a battery 14 to the CPU 18, then the digital camera 10 starts.

A photometry switch SWS is turned on when a shutter button (not shown) is partially depressed. When the photometry switch SWS is turned on, the CPU 18 carries out photometric operations and distance-measuring operations.

That is, an exposure value is calculated based on the input from a photometry sensor 11, and values that are necessary for photography such as aperture value, shutter speed, and exposure time of an imaging device 20, are calculated by the CPU 18. A value that is input by a button operation of a user can be set as the exposure time, under the control of the CPU 18. Further, the driving amount of a photographing lens 16 is calculated by the CPU 18 based on the input from a distance-measuring sensor 12, and the control signals are output from the CPU 18 to a focus-driving circuit 21. As a result, driving signals are output from the focus-driving circuit 21 to the photographing lens 16.

A release switch SWR is turned on if the shutter button is fully depressed. If the release switch SWR is turned on, the driving amount of a diaphragm-driving mechanism (not shown) and a shutter (not shown) are calculated in accordance with the aperture value that is calculated in the photometric operation. Based on the calculation result, control signals are output from the CPU 18 to a diaphragm-driving circuit 22 and a shutter-driving circuit 23.

Further, driving signals are output from the diaphragm-driving circuit 22 to the diaphragm-driving mechanism (not shown), so that the diaphragm-driving mechanism is driven. When the diaphragm-driving mechanism is driven, the movement is transmitted to a diaphragm (not shown), and the aperture of the diaphragm is set to a predetermined value. Further, driving signals are output from the shutter-driving circuit 23 to the shutter, and the shutter is opened for a predetermined period. Then, light transmitted through the photographing lens 16 is incident on a receiving surface of the imaging device 20.

Control signals are output from the CPU 18 to an imaging device driving circuit 24 based on the exposure time of the imaging device 20 explained above, then control signals are output from the imaging device driving circuit 24 to the imaging device 20. Photometric conversion of a subject image that is imaged on the light-receiving area is carried out on the imaging device 20, and analog image signals are output from the imaging device 20. The analog image signals are transferred to an A/D conversion circuit 25, and converted to digital image signals. The digital image signals are input to the CPU 18.

The digital image signals are subjected to predetermined imaging operations under the control of the CPU 18. In the process of the imaging operations, image data are temporarily stored in a DRAM 30. After the imaging operations, the image data are transmitted to an LCD 31 provided on a rear surface of the digital camera 10, then a subject image is displayed on the LCD 31.

Various programs for controlling the digital camera 10 are stored in an EEPROM 32. Further, if the luminance of a subject is not enough, driving signals are output from the CPU 18 to a flash circuit 33, so that light emits from a flash device (not shown).

An X-axis gyro sensor 40X detects an angular velocity of revolution of the digital camera 10 around the X-axis on the perpendicular plane of the optical axis of the photographing lens 16. The X-axis, for example, runs in a direction parallel to a long side of the rectangle imaging device 20. The X-axis gyro sensor 40X outputs a voltage that is in proportion to the detected angular velocity of revolution around an X-axis, to an X-axis shake-correcting operation circuit 70X. In the X-axis shake-correcting operation circuit 70X, a gain amplifier, a high-pass filter, an A/D converter, and an integrating circuit (none of which are shown) are provided. The X-axis shake-correcting operation circuit 70X generates position signals representing the position of the digital camera 10, by integrating the angular velocity based on the voltage applied from the X-axis gyro sensor 40X.

The position signals generated in the X-axis shake-correcting operation circuit 70X are output to one of first to fifth X-axis high-pass filters 51X to 55X via an X-axis transfer switch 50X. At that time, the X-axis transfer switch 50X causes one of the first to fifth X-axis high-pass filters 51X to 55X to be connected to the X-axis shake-correcting operation circuit 70X, in accordance with the set exposure time of the imaging device 20, under the control of the CPU 18. That is, the CPU 18 selects and sets a cut-off frequency in accordance with the exposure time, from a plurality of candidate cut-off frequencies that can be set.

Low-frequency components of the position signals, which are lower-Erequency components than one of the predetermined cut-off frequencies previously set in the first to fifth X-axis high-pass filters 51X to 55X to which the position signals are output, are excluded. The position signals whose low frequency-components are excluded are transferred to a shake-correcting mechanism 80 as data for correcting a shake of the digital camera 10. Then, the imaging device 20 is moved on the perpendicular plane of the optical axis of the photographing lens 16 by the shake-correcting mechanism 80, based on the components of the position signals that are higher than the cut-off frequency. As explained above, correcting a shaking of the hand (that is, preventing an image shake in a still image) is possible by moving the imaging device 20 by the shake correcting mechanism 80 and other components.

Note that in the Y-axis direction perpendicular to the X-axis, on a plane perpendicular to the optical axis of the photographing lens 16, (that is, for example, a direction parallel to a short side of the rectangle imaging device 20), a shake is corrected similarly to in the X-axis direction. That is, first, an angular velocity of revolution of the digital camera 10 around the Y-axis is detected by a Y-axis gyro sensor 40Y, then a voltage that is in proportion to the detected angular velocity of revolution around the Y-axis is applied to a Y-axis shake-correcting operation circuit 70Y. Then, in the Y-axis shake-correcting operation circuit 70Y, position signals representing the position of the digital camera 10 are generated by integrating the angular velocity.

The generated position signals are transferred to one of the first to fifth Y-axis high-pass filters 51Y to 55Y, via a Y-axis transfer switch 50Y, then low-frequency components of the position signals are excluded, The position signals whose low-frequency components are excluded, are transferred to the shake-correcting mechanism 80. As a result, the imaging device 20 is moved on the perpendicular plane of the optical axis of the photographing lens 16 by the shake-correcting mechanism 80, based on the components of the position signals that are higher than the cut-off frequency.

Note that movement of the imaging device 20 caused by the shake-correcting mechanism 80 is possible within a predetermined area, so that a high amount of shake can not be fully corrected. In particular, the incomplete shake correction trend is clear when a short exposure time is set, because the exposure time may be over before the shake-correcting function works. However, in this embodiment, efficiently correcting a high amount of shake where the imaging device 20 reaches the limit position of its movable area is possible, as explained below.

Figure 2:
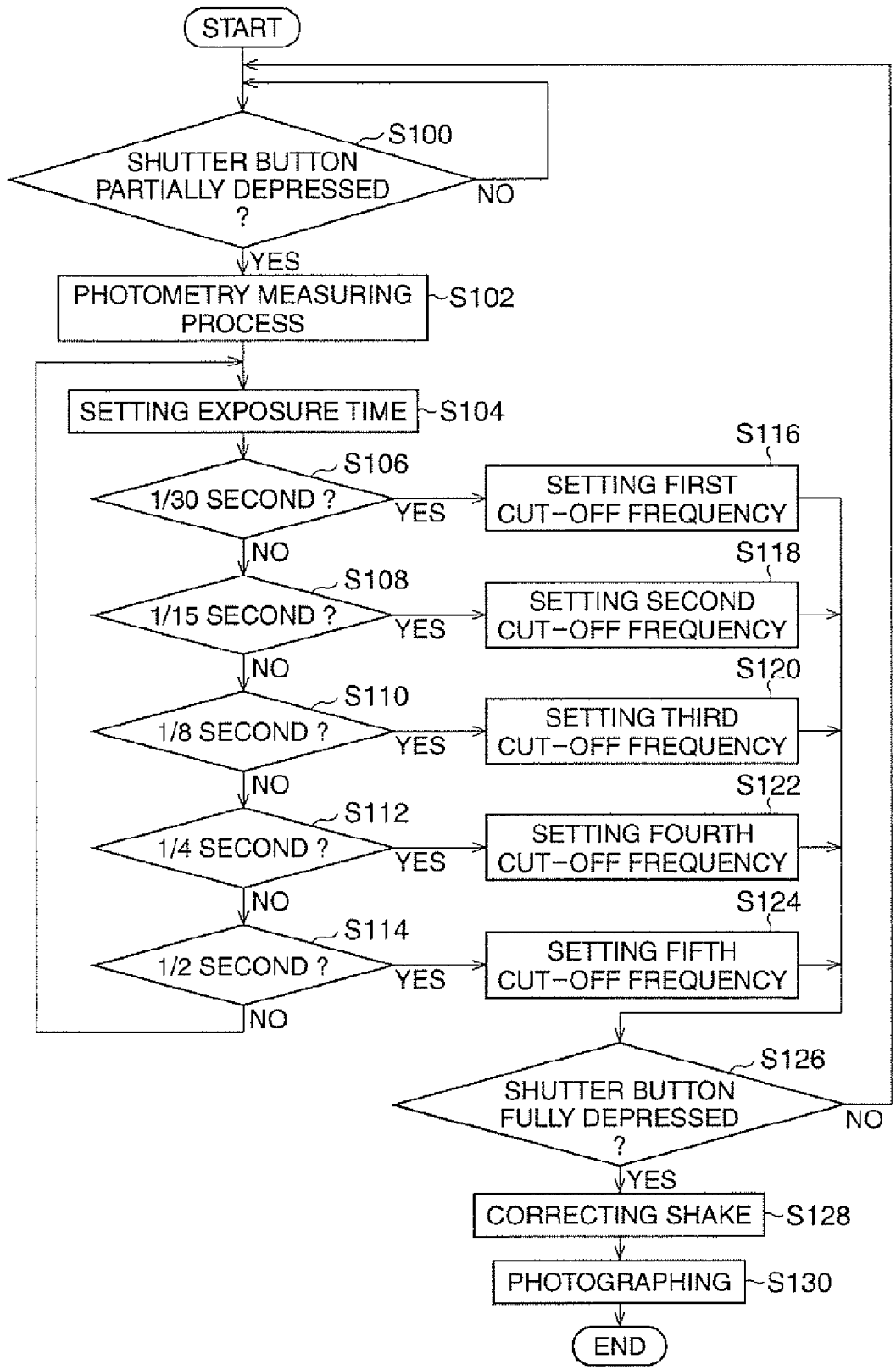
FIG. 2 is a flowchart representing an anti-shake control routine.

An anti-shake control routine starts when the power switch of the digital camera 10 is turned on (see FIG. 2). At step S100, whether the shutter button is partially depressed or not (that is, whether the photometry switch SWS is turned on or not) is determined. If it is determined that the shutter button is partially depressed and the photometry switch SWS is turned on, the process proceeds to step S102. At step S102, photometry measuring processes and distance measuring processes are carried out, then the process proceeds to step S104.

At step S104, the exposure time of the imaging device 20 is set to a value that is calculated by the CPU 18 or selected by a user, then the process proceeds to step S106. At steps S106 to S124, a cut-off frequency in accordance with the exposure time set at step S104 is selected and set. That is, a cut-off frequency in accordance with the set exposure time is selected from the first to fifth cut-off frequencies, which can be set, and is set by the CPU 18.

For example, when the exposure time selected at step S104 is 1/30 second, the first cut-off frequency is set at step S116, and when the exposure time is 1/4 second, the fourth cut-off frequency is set at step S122. The value of the cut-off frequency is lower in the order of the first cut-off frequency to the fifth cut-off frequency; therefore, the shorter the set exposure time, the higher the cut-off frequency that is selected and set, as explained below.

At step S126, whether the shutter button is fully depressed or not (that is, whether the release switch SWR is turned on or not) is determined. If it is determined that the shutter button is fully depressed and the release switch SWR is turned on, the process proceeds to step S128. On the other hand, if it is determined that the release switch SWR is turned off, the process returns to step S100.

At step S128, the imaging device 20 is moved by the shake-correcting mechanism 80, based on the position signals whose low-frequency components are excluded, so that the shake is corrected. Then the process proceeds to step S130. At step S130, a photographing operation is carried out, a subject image is generated, and the anti-shake control routine ends.

Note that the operation for selecting a cut-off frequency in the CPU 18, is always carried out while the digital camera 10 is operating, and every time the exposure time of the imaging device 20 is changed, a different cut-off frequency from the one selected before the change of the exposure time, is selected, as it is clear from the anti-shake control routine. When generation of a subject image is commanded by fully depressing the shutter button, the cut-off frequency in accordance with the exposure time set at the time is set.

In the digital camera 10, the first to fifth cut-off frequencies can be set (see steps S116 to S124 in FIG. 2), and the value of the cut-off frequency is lower in the order of the first cut-off frequency to the fifth cut-off frequency. For example, in this embodiment, the first cut-off frequency is 3.0 Hz, the second cut-off frequency is 1.5 Hz, the third cut-off frequency is 0.8 Hz, the fourth cut-off frequency is 0.4 Hz, and the fifth cut-off frequency is 0.2 Hz.

Figure 3:
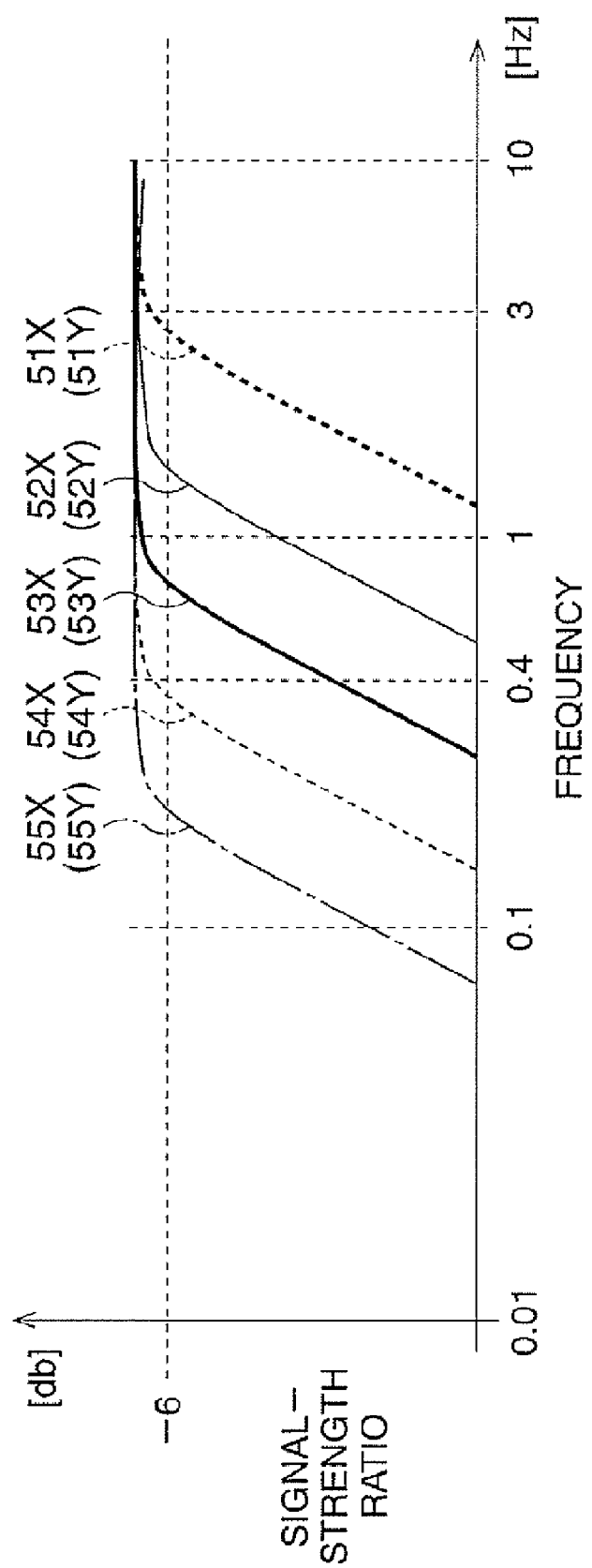
FIG. 3 is a view representing cut-off lines between low-frequency components that are excluded by first to fifth high-pass filters, and high-frequency components that are used for correcting a shake, for each cut-off frequency.

Therefore, when the first cut-off frequency is set, lower-frequency components of position signals than a cut-off line for the first X-axis high-pass filter 51X (or for the first Y-axis high-pass filter 51Y) represented in FIG. 3 (that is, position signals of lower frequency than 3.0 Hz) are excluded by the first X-axis high-pass filter 51X (or by the first Y-axis high-pass filter 51Y). Then, a shake of the digital camera 10 is corrected based on the components of the position signals having a higher frequency than 3.0 Hz. On the other hand, when the fourth cut-off frequency is set, frequency components of position signals lower than 0.4 Hz, represented by a cut-off line for the fourth X-axis high-pass filter 54X (or for the first Y-axis high-pass filter 51Y), are excluded by the fourth X-axis high-pass filter 54X.

Note that the cut-off lines in FIG. 3 represent the border between low-frequency components to be excluded and high-frequency components to be used to correct a shake approximately; for example, "−6" db, which represents a signal-strength ratio of an input position signal to an output position signal in the vertical axis, is just a standard value.

The low-frequency components of the position signals to be excluded by each of the high-pass filters, and the high frequency components to be actually used for correcting a shake, are explained below (see FIGS. 4 and 5). Note that only the frequency components below 5 Hz included in the position signals that are output from the X-axis shake-correcting operation circuit 70X are simplified and represented as square waves in FIG. 4, for convenience of explanation. That is, although higher-frequency components are included in the output signals in general, in FIG. 4, it is represented that the output signals have only components of 1 Hz, 2 Hz, and 5 Hz.

Figure 4:
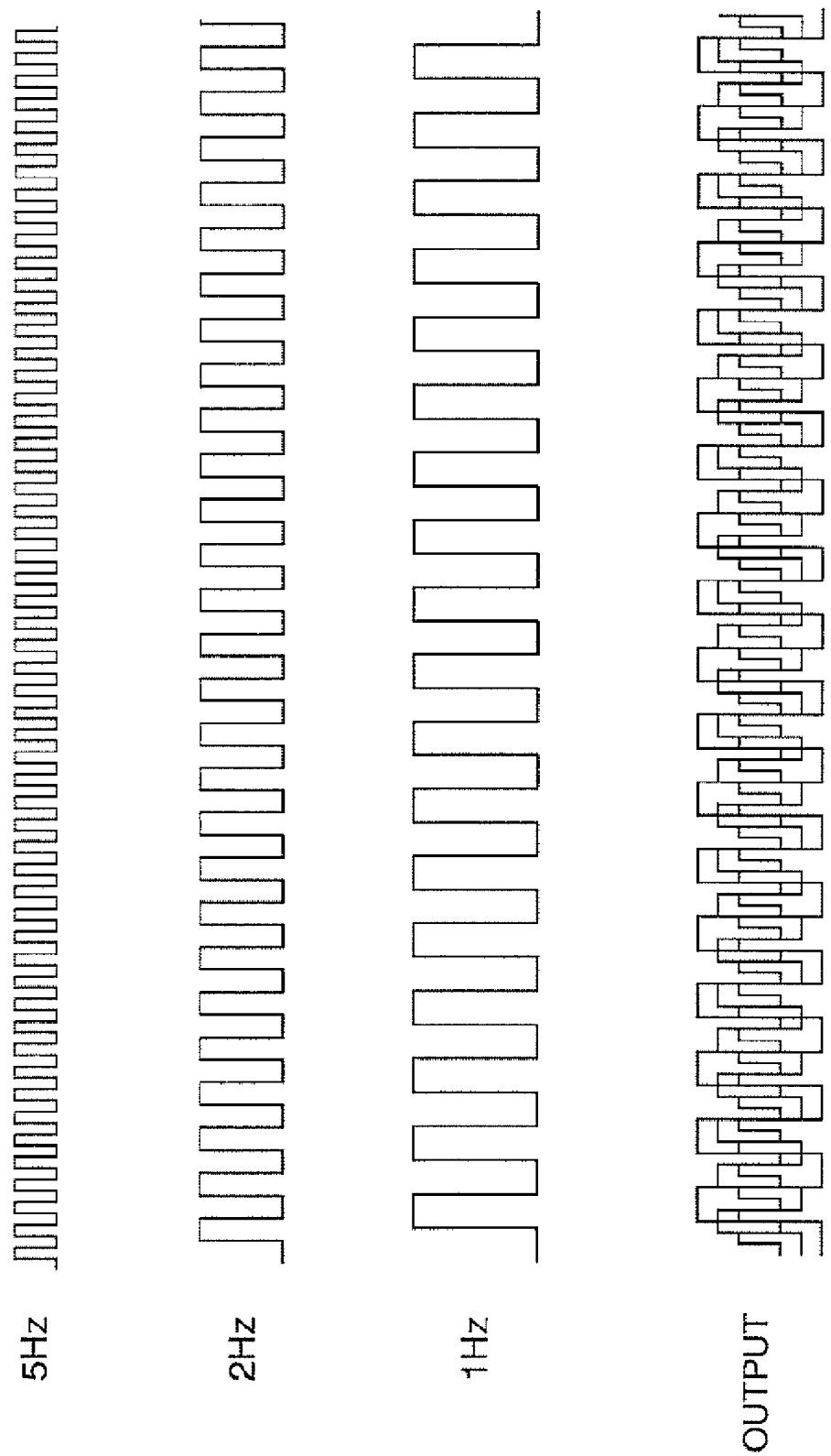
FIG. 4 is a view representing the frequency components of position signals that are output from an X-axis shake-correcting operation circuit, and that are below 10 Hz, as square waves.

If the output signals represented in FIG. 4 are input to the first X-axis high-pass filter 51X, the frequency components of 1 Hz and 2 Hz are excluded, and only the frequency components of 5 Hz are used for correcting a shake, as represented in FIG. 5(A), because the first cut-off frequency of 3 Hz is set.

Further, if the output signals represented in FIG. 4 are input to the second X-axis high-pass filter 52X, then the second cut-off frequency of 1.5 Hz is set, and only the frequency components of 2 Hz and 5 Hz are used for correcting a shake, as represented in FIG. 5(B). If one of the third to fifth cut-off frequencies of 0.8 Hz, 0.4 Hz, or 0.2 Hz is set, all components of the output signals that are composed of frequency components higher than or equal to 1.0 Hz as represented in FIG. 4, pass through one of the third to fifth X-axis high-pass filters 53X to 55X, and are used for a shake correction.

Note that, for example, each of the first to fifth cut-off frequencies in Hz has the same value as one tenth of a reciprocal number of the set exposure time in second, although their units are different from one another. That is, the values of the first to fifth cut-off frequencies of 3 Hz, 1.5 Hz, 0.8 Hz, 0.4 Hz, and 0.2 Hz are the same as those of the one-tenth values of the reciprocal numbers of the exposure times of 1/30 second, 1/15 second, 1/8 second, 1/4 second, and 1/2 second to be set (see steps S106 to S124 in FIG. 2).

In this embodiment, as explained above, when short exposure times are set and a high amount of shake over the correctable limit occurs, superior anti-shake function can be displayed. That is, a high cut-off frequency is automatically set when the exposure time is short, so that movement of the imaging device 20 to the limit position of its movable area due to a shake whose frequency is low and whose amplitude is high, and a shake having a relatively high-frequency component is corrected efficiently.

Note that in the anti-shake apparatus in the embodiment, a shake is corrected by moving the imaging device 20. However, the method for correcting a shake need not be limited to that. For example, a shake can be canceled by driving a correcting optical system included in a photographing optical system in the digital camera 10, instead of moving the imaging device 20. Further, in the digital camera 10 or in a video camera including an anti-shake apparatus, a shake in a moving image can be corrected.

In terms of setting the cut-off frequencies, the possible number is not limited to that in the embodiment; for example, more than or less than five cut-off frequencies of the first to fifth cut-off frequencies may be set. Further, not only the numbers of the cut-off frequencies, but also the values thereof, also may be different from those in the embodiment.

This invention is not limited to that described in the preferred embodiment; namely, various improvements and changes may be made to the present invention without departing from the spirit and scope thereof.

The present disclosure relates to subject matter contained in Japanese Patent Application No. 2005-282224 (filed on Sep. 28, 2005), which is expressly incorporated herein, by reference, in its entirety.

The invention claimed is:

1. An anti-shake apparatus for a photographic device, said anti-shake apparatus comprising:
   an angular velocity detector that detects an angular velocity of said photographic device;
   a position signal generator that generates position signals representing a position of said photographic device, by integrating said angular velocity;
   a shake corrector that corrects a shake of said photographic device, based on said position signals; and
   an exposure time setter that sets an exposure time of said photographic device;
   wherein said shake corrector corrects said shake based on said position signals that have frequencies higher than a predetermined cut-off frequency that is determined in accordance with said exposure time; and
   wherein a cut-off frequency selecting operation is always carried out while the photographic device is operating, and when the generation of a subject image is commanded, a cut-off frequency in accordance with the exposure time set at the time is set.

2. The anti-shake apparatus according to claim 1, wherein the shorter the said exposure time, the higher the said cut-off frequency.

3. The anti-shake apparatus according to claim 1, further comprising a high-pass filter that excludes low-frequency components of said position signals.

4. The anti-shake apparatus according to claim 1, wherein said photographic device comprises an imaging device, said shake corrector further comprises an imaging device mover that moves said imaging device, and said imaging device mover moves said imaging device so that said shake is corrected.

5. The anti-shake apparatus according to claim 1, further comprising a cut-off frequency setter that sets said cut-off frequency, from a plurality of candidate cut-off frequencies that can be set, in accordance with said exposure time.

6. The anti-shake apparatus according to claim 5, wherein said photographic device comprises an image-generating commander that command generation of a subject image, and said shake corrector corrects a shake of said photographic device, based on said position signals whose frequencies are higher than said cut-off frequency that is set when generation of a subject image is commanded.

7. The anti-shake apparatus according to claim 1, wherein said cut-off frequency in Hz has the same value as one-tenth of a reciprocal number of said exposure time in second.

8. A photographic device comprising:
   an angular velocity detector that detects an angular velocity of said photographic device;
   a shake corrector that corrects a shake of said photographic device, based on said angular velocity; and
   an exposure time setter that sets an exposure time of said photographic device;
   wherein a component of said shake that said shake corrector can correct is determined in accordance with said exposure time; and
   wherein a cut-off frequency selecting operation is always carried out while the photographic device is operating, and when the generation of a subject image is commanded, a cut-off frequency in accordance with the exposure time set at the time is set.

9. The photographic device according to claim 8, wherein the shorter the said exposure time, the higher the minimum frequency of said shake that said shake corrector can correct.

* * * * *